(12) United States Patent
Olgaard et al.

(10) Patent No.: US 7,093,017 B1
(45) Date of Patent: *Aug. 15, 2006

(54) SYSTEM, METHOD AND ARTICLE OF MANUFACTURE FOR FACILITATING USER INTERFACE ROAMING IN AN INTERFACE ROAMING NETWORK FRAMEWORK

(75) Inventors: Christian Volf Olgaard, Sunnyvale, CA (US); Spiros Nikolaos Bouas, Menlo Park, CA (US); Rick William Umstattd, San Jose, CA (US); Benny Madsen, Los Altos, CA (US)

(73) Assignee: Litepoint, Corp., San Jose, CA (US)

( * ) Notice: Subject to any disclaimer, the term of this patent is extended or adjusted under 35 U.S.C. 154(b) by 787 days.

This patent is subject to a terminal disclaimer.

(21) Appl. No.: 09/695,493

(22) Filed: Oct. 24, 2000

(51) Int. Cl.
*G06F 15/16* (2006.01)
*G06F 15/173* (2006.01)

(52) U.S. Cl. ............ 709/227; 709/228; 709/223; 709/224

(58) Field of Classification Search ........... 709/204, 709/206, 207, 209, 213, 216, 223–225, 203, 709/227–229, 241, 248
See application file for complete search history.

(56) References Cited

U.S. PATENT DOCUMENTS

| | | | |
|---|---|---|---|
| 5,412,375 A * | 5/1995 | Wood ............... 455/451 |
| 5,703,929 A | 12/1997 | Schillaci et al. |
| 6,091,956 A | 7/2000 | Hollenberg |
| 6,112,103 A | 8/2000 | Puthuff |
| 6,138,009 A | 10/2000 | Birgerson |
| 6,138,019 A | 10/2000 | Trompower et al. |
| 6,175,922 B1 | 1/2001 | Wang |
| 6,198,915 B1 | 3/2001 | McGregor et al. |
| 6,243,581 B1 | 6/2001 | Jawanda |
| 6,256,666 B1 | 7/2001 | Singhal |
| 6,298,234 B1 | 10/2001 | Brunner |
| 6,304,898 B1 * | 10/2001 | Shiigi ............... 709/206 |
| 6,345,303 B1 | 2/2002 | Mahany et al. |
| 6,356,761 B1 | 3/2002 | Huttunen et al. |
| 6,400,954 B1 | 6/2002 | Khan et al. |
| 6,421,716 B1 * | 7/2002 | Eldridge et al. ......... 709/219 |
| 6,421,733 B1 | 7/2002 | Tso et al. |
| 6,438,575 B1 | 8/2002 | Khan et al. |
| 6,463,464 B1 | 10/2002 | Lazaridis et al. |
| 6,477,117 B1 | 11/2002 | Narayanaswami et al. |

(Continued)

FOREIGN PATENT DOCUMENTS

DE 10049291 A1 4/2002

*Primary Examiner*—Ario Etienne
*Assistant Examiner*—Hussein Elchanti
(74) *Attorney, Agent, or Firm*—Vedder, Price, Kaufman & Kammholz, P.C.

(57) ABSTRACT

A system, method and article of manufacture are provided for facilitating user interface roaming in an interface roaming network framework. Received from a wireless link is a list of usable interface clients in proximity to the wireless link. Each usable interface client has functional capabilities associated with it. One of the interface clients is selected from the list and the wireless link is notified of the selected interface client. A connection is then initiated with the selected interface client and an application is executed based on the capabilities of the selected interface client in order to generate content. The generated content is then transmitted to the interface client so that the content may be displayed using the interface client.

36 Claims, 8 Drawing Sheets

U.S. PATENT DOCUMENTS

| | | |
|---|---|---|
| 6,477,581 B1 | 11/2002 | Carpenter et al. |
| 6,542,491 B1 | 4/2003 | Tari et al. |
| 6,542,740 B1 | 4/2003 | Olgaard et al. |
| 6,560,216 B1 | 5/2003 | McNiff et al. |
| 6,621,413 B1 | 9/2003 | Roman et al. |
| 6,633,759 B1 | 10/2003 | Kobayashi |
| 6,633,761 B1 | 10/2003 | Singhal et al. |
| 6,654,814 B1 | 11/2003 | Britton et al. |
| 6,757,718 B1 | 6/2004 | Halverson et al. |
| 6,826,554 B1 | 11/2004 | Sone |
| 2001/0048449 A1* | 12/2001 | Baker .......................... 345/758 |

* cited by examiner

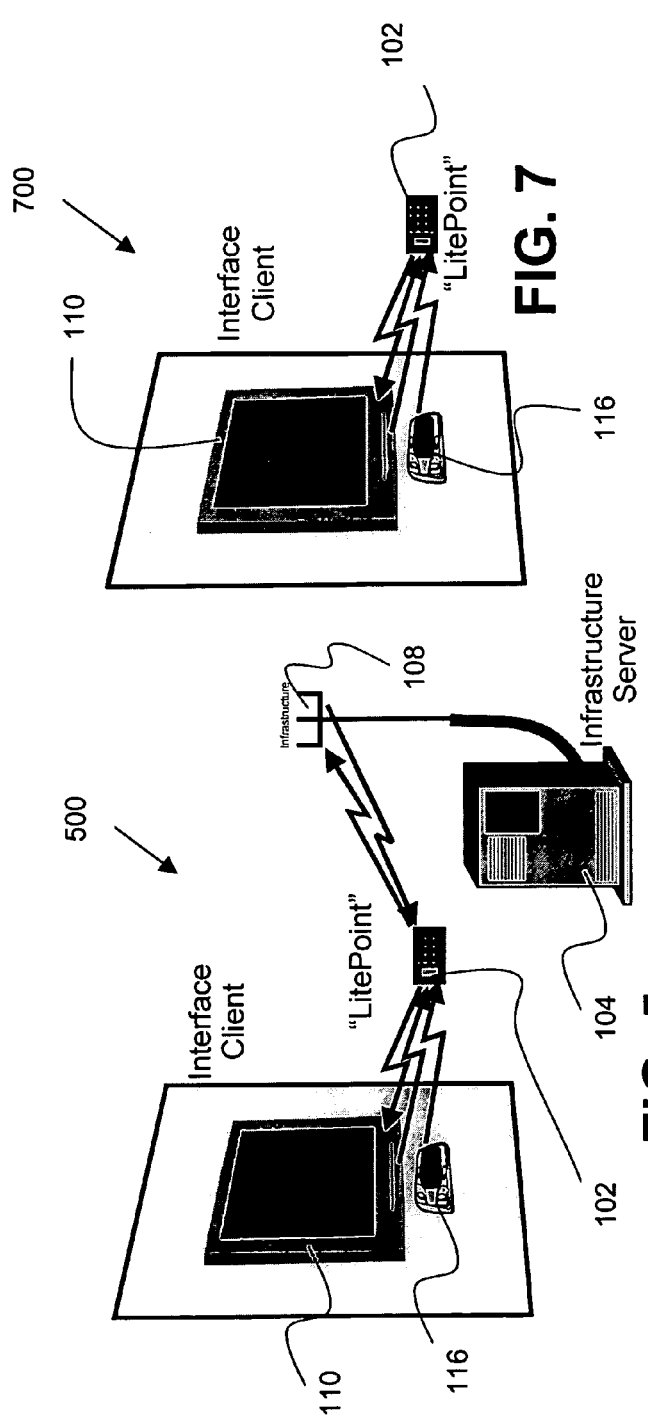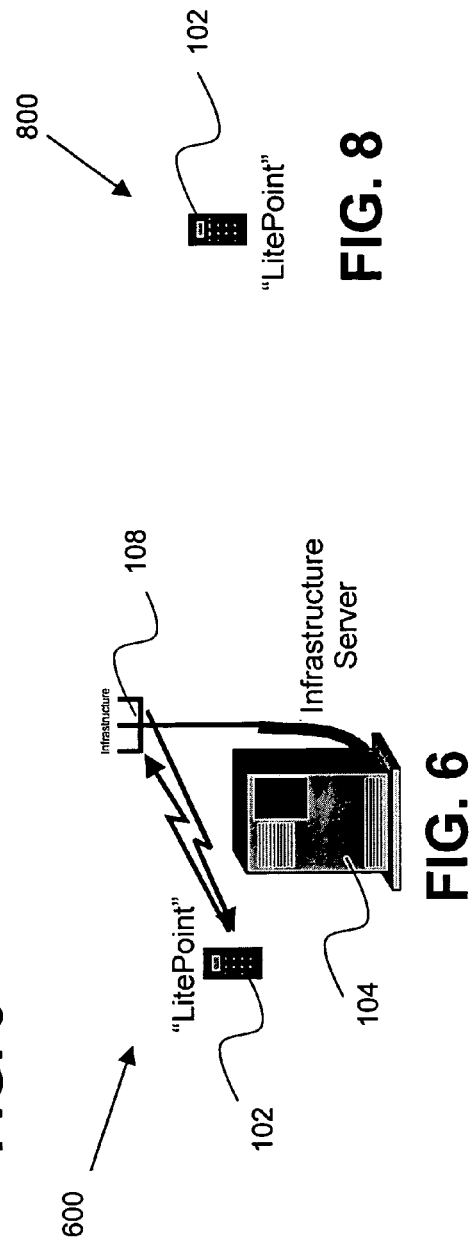

SYSTEM, METHOD AND ARTICLE OF MANUFACTURE FOR FACILITATING USER INTERFACE ROAMING IN AN INTERFACE ROAMING NETWORK FRAMEWORK

FIELD OF THE INVENTION

The present invention relates generally to hybrid networks and, more particularly, to a network framework for facilitating interface roaming.

BACKGROUND OF THE INVENTION

As wireless communication is moving from being voice centric to data centric, the need to move towards devices that are more integrated are being pursued. People are creating smart phones, which integrate PDA functionality and a larger display with a cell phone, or people are trying to integrate cell phone (voice & data) functionality into a pocket sized PDA. The goal of most of these efforts is to offer the user a wireless Internet experience. However, this integration effort is difficult, as the user on the one expects a small form factor cell phone, but at the same time expect a full graphical internet experience when surfing the net, and a large display is required to offer an acceptable experience. Therefore, existing integration efforts are making a trade off between size and graphical experience (display size).

SUMMARY OF THE INVENTION

A system, method and article of manufacture are provided for facilitating user interface roaming in an interface roaming network framework. Received from a wireless link is a list of usable interface clients in proximity to the wireless link. Each usable interface client has functional capabilities associated with it. One of the interface clients is selected from the list and the wireless link is notified of the selected interface client. A connection is then initiated with the selected interface client and an application is executed based on the capabilities of the selected interface client in order to generate content. The generated content is then transmitted to the interface client so that the content may be displayed using the interface client.

In an embodiment of the present invention, a notification may be received from the wireless link upon activation indicating that the wireless link has been is activated. Upon activation, the wireless link may determine the usable interface clients in its proximity. In another embodiment of the present invention, information may be received that was input from the user in response to the generated content. Subsequent content may then be generated based on the received information and then transmitted to the interface client for display. In one aspect of such an embodiment, the information from the user may be input into the wireless link which then transmits the information to the server.

In an aspect of the present invention, the connection with the selected interface client may be initiated via the wireless link. In another aspect of the present invention, the generated content may be transmitted to the interface client via the wireless link. In a further aspect of the present invention, each interface client includes a visual display for displaying the content. In yet another aspect of the present invention, the wireless link may receive the content if no usable interface clients are proximate to the wireless link (i.e., the list of usable interface clients includes zero usable interface clients in proximity to the wireless link). In an additional aspect of the present invention, the wireless link and the interface client are may be capable of communicating utilizing Internet protocols such as TCP/IP or IPX protocols. In a further aspect of the present invention, the wireless link may have telephony capabilities so that it may be used as a mobile telephone.

In one embodiment of the present invention, a notification may be received that another or second interface client better suited for displaying the content is proximate to the wireless link. The user may then be queried as to whether the user would like to switch to the second interface client or remain with the currently used interface client. In one aspect of the such an embodiment, the query may be displayed on the current interface client. If a response to the query is received from the user indicating that the user wants to switch to the second interface client, subsequently generated content is then generated based on the capabilities of the second interface client and then transmitted to the second interface client for display thereon.

In yet a further embodiment of the present invention, a user may input information into the wireless link whereupon the information is only transmitted to the server by the wireless link when a connection between the server and the wireless link is available. In another embodiment of the present invention, execution of an application based on capabilities of the selected interface client may further require uploading from a data store information relating to configuring the application based on the capabilities of the selected interface client.

BRIEF DESCRIPTION OF THE DRAWINGS

The foregoing and other features, aspects and advantages are better understood from the following detailed description, appended claims, and accompanying drawings where:

FIG. 5 is a schematic diagram illustrating a normal mode of operation in accordance with an embodiment of the present invention;

FIG. 6 is a schematic diagram illustrating a mode of operation where no external interface client is available in accordance with an embodiment of the present invention;

FIG. 7 is a schematic diagram illustrating a mode of operation where there is no infrastructure connection from the wireless link to the infrastructure server but where there is access to an interface client proximal to the wireless link in accordance with an embodiment of the present invention;

FIG. 8 is a schematic diagram of a mode of operation wherein there is no connection to infrastructure from the wireless link and no external interface client access in accordance with an embodiment of the present invention;

DETAILED DESCRIPTION

Figure 1:
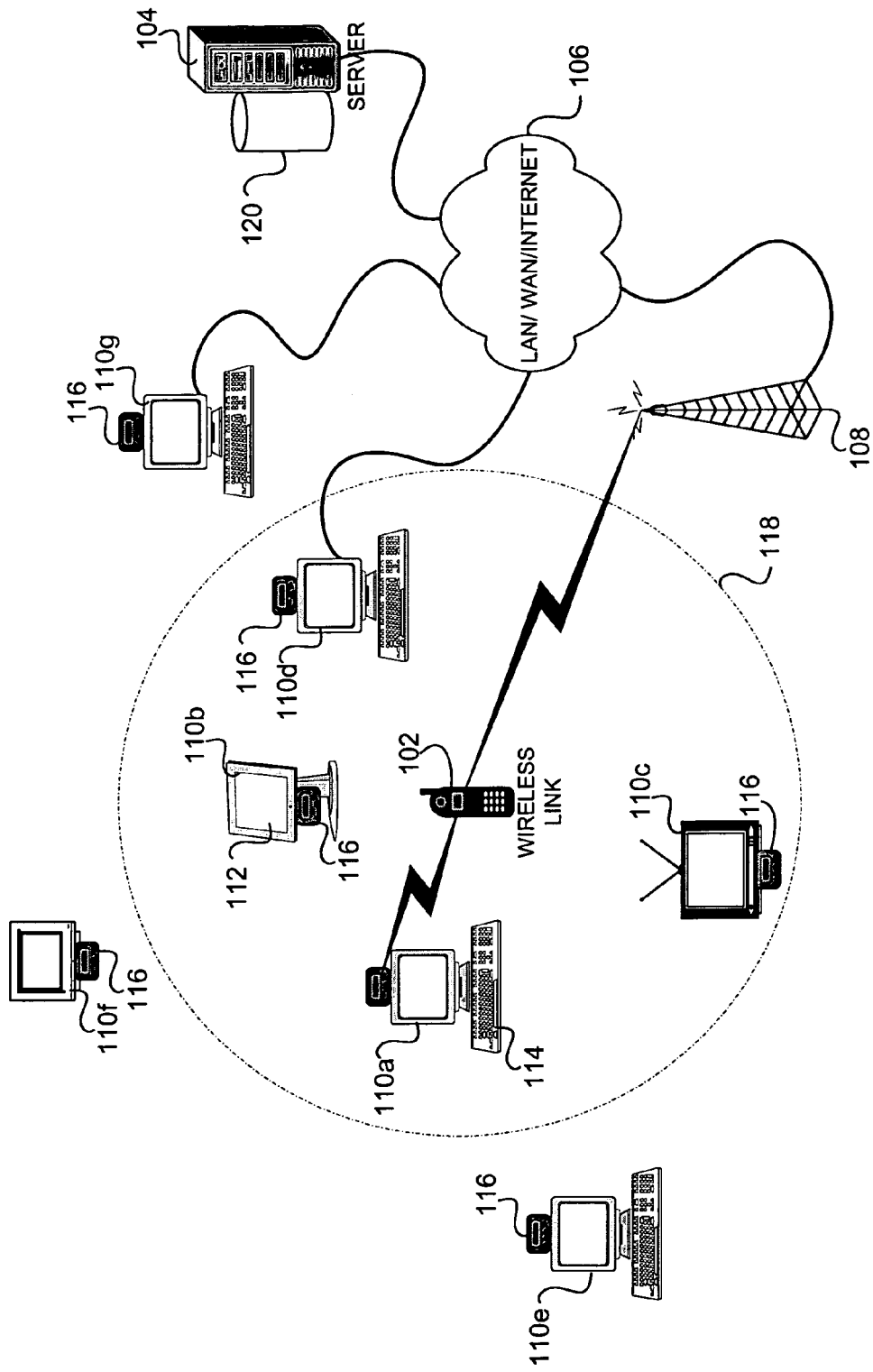
FIG. 1 is a schematic diagram of an interface roaming network framework in accordance with an embodiment of the present invention.

User interface roaming may generally be defined as the ability to move from one interface (input and output device) and move to another interface while either: (1) maintaining the status of the application(s) and being able to continue from where the previous device was left—even if the interface capabilities change, or (2) changing the status of the application(s) and being able to use a new application based on the capabilities of the new interface client.

To solve the problem of having a small cell phone be able to create a sufficient graphical interface to enable a web surfing experience, a system is disclosed that enables interface roaming. Users utilize interface devices ("interface clients") external to the actual communication engine. This enables use of a small communication device (such as a mobile phone or a wireless personal digital assistant ("PDA")) while maintaining the ability to present a graphical interface on a display separate from the device. The interface client may be any display which is close or proximate to the user and the user's communication device. The system will select the best-suited display available to the user.

At least two embodiments exist: (1) an embodiment where a connection between an interface client and an infrastructure server is made via a wireless link; and (2) an embodiment where a pre-existing connection exists between an interface client and an infrastructure server.

In an embodiment where the connection is made between an interface client and an application via a wireless link, a user carries a wireless link (such as, for example, a mobile phone-like device) and this wireless link creates a connection to the interface client near the user and creates a connection from the wireless link to the application or infrastructure server. In such an embodiment, the wireless link may be considered to act as a gateway with added functionality. The handling of the display of an application on the interface is primarily controlled from and by the infrastructure server. In a preferred embodiment, the wireless link may include personal identification information associated with the user and provide ways to encrypt the data to different extends, for example, from simple encryption to offering a wireless VPN connection.

In an embodiment where a connection between an interface client and an infrastructure server is made using an existing link, the interface client is already connected (wired or wireless) directly to the infrastructure server without communication through the wireless link. In such an embodiment, the user does not need a wireless link since the interface client can already make a connection to the infrastructure server. However, in such an embodiment, a user-identification associated with the user may be required to identify the user to the system. The user-identification may be provided as part of the wireless link's own electronic identification, or any other usable identification method. As a further feature in this embodiment, the interface client can communicate to the infrastructure server not only through its own link, but it can also go through the user's wireless link if available (for example if highly sensitive data must be transferred).

In general applications are primarily executed by the infrastructure server. This makes an interface client serve as an intelligent thin client, that performs the interface translation functions of the application run by the infrastructure server. It is the infrastructure server that modifies the interface appearance to match the capabilities of the selected interface client. What makes this possible is a protocol that allows the interface client to communicate to the infrastructure server via the most suitable connection available and visa versa.

FIG. 1 is a schematic diagram of an interface roaming network framework 100 in accordance with an embodiment of the present invention. In this framework 100, a wireless link 102 is provided which may be connected to an infrastructure server 104 via a network 106. The wireless link 102 may (or may not) include a visual display and an input device may also have (optionally) telephony capability. The network 106 may be any sort of network, such as a LAN, a WAN, or even the Internet, and may include a wireless network portion 108 which is in communication with the wireless link.

The framework 100 also includes a plurality of variously located interface clients 110*a*, 110*b*, 110*c*, 110*d*, 110*e*, 110*f*, 110*g*. An interface client includes a processor and preferably has some sort of visual display (e.g. display 112) such as, for example, a monitor or a television. An interface client may also include some sort of input device (e.g., keyboard 114) for inputting information and commands. Some of the interface clients (e.g., interface clients 110*d*, 110*g*) in the framework 100 may also be directly connected to the network 106 to permit communication via the network between the interface client and the infrastructure server 104.

Each interface client preferably also includes a transceiver 116 for communicating with the wireless link (and the infrastructure server via the wireless link) by, for example, infrared or RF signals. The wireless link may also have a proximal range 118 within which interface clients (e.g., interface clients 110*a*, 110*b*, 110*c*, 110*d*) are considered within the proximity of the wireless link and outside of which interface clients (e.g., interface clients 110*e*, 110*f*, 110*g*) are considered outside the proximity of the wireless link. It should be noted that communication between the wireless link and interface clients need not be limited to interface clients inside the proximal range—the range of communication between the wireless link and an interface client may be greater than the proximal range. The proximal range is simply a range inside of which interface clients are considered proximate to the wireless link (and thereby proximate to a user of the wireless link).

With continuing reference to FIG. 1, the interface server 104 may also be connected to a data store/database 120 in which application data and configuration data relating to the various types of interface clients may be stored.

Figure 2:
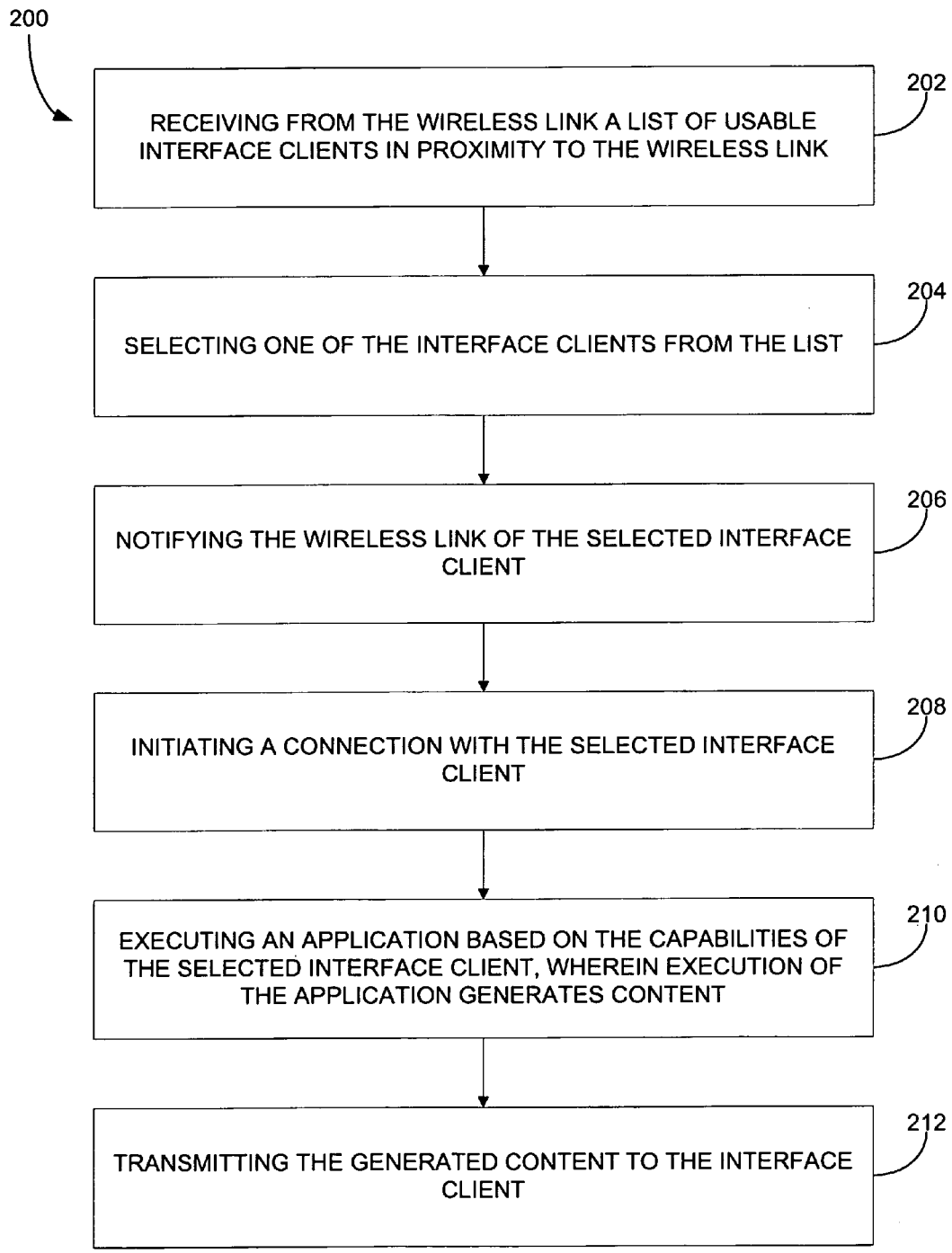
FIG. 2 is a flowchart of a process for facilitating user interface roaming in an interface roaming network framework in accordance with an embodiment of the present invention.

FIG. 2 is a flowchart of a process 200 for facilitating user interface roaming in an interface roaming network framework in accordance with an embodiment of the present invention. In operation 202, a list of usable interface clients in proximity to a wireless link is received from the wireless link. Each usable interface client has functional capabilities associated with it. In operation 204, one of the interface clients is selected from the list and the wireless link is notified of the selected interface client in operation 206. A connection is then initiated with the selected interface client in operation 208 and an application is executed based on the capabilities of the selected interface client in order to generate content in operation 210. In operation 212, the generated content is then transmitted to the interface client so that the content may be displayed using the interface client.

In an embodiment of the present invention, a notification may be received from the wireless link upon activation indicating that the wireless link has been is activated. Upon activation, the wireless link may determine the usable interface clients in its proximity. In another embodiment of the present invention, information may be received that was input from the user in response to the generated content. Subsequent content may then be generated based on the received information and then transmitted to the interface client for display. In one aspect of such an embodiment, the information from the user may be input into the wireless link which then transmits the information to the server.

In an aspect of the present invention, the connection with the selected interface client may be initiated via the wireless link. In another aspect of the present invention, the generated content may be transmitted to the interface client via the wireless link. In a further aspect of the present invention, each interface client includes a visual display for displaying the content. In yet another aspect of the present invention, the wireless link may receive the content if no usable interface clients are proximate to the wireless link (i.e., the list of usable interface clients includes zero usable interface clients in proximity to the wireless link). In an additional aspect of the present invention, the wireless link and the interface client are may be capable of communicating utilizing Internet protocols such as TCP/IP or IPX protocols. In a further aspect of the present invention, the wireless link may have telephony capabilities so that it may be used as a mobile telephone.

In one embodiment of the present invention, a notification may be received that another or second interface client better suited for displaying the content is proximate to the wireless link. The user may then be queried as to whether the user would like to switch to the second interface client or remain with the currently used interface client. In one aspect of the such an embodiment, the query may be displayed on the current interface client. If a response to the query is received from the user indicating that the user wants to switch to the second interface client, subsequently generated content is then generated based on the capabilities of the second interface client and then transmitted to the second interface client for display thereon.

In yet a further embodiment of the present invention, a user may input information into the wireless link whereupon the information is only transmitted to the server by the wireless link when a connection between the server and the wireless link is available. In another embodiment of the present invention, execution of an application based on capabilities of the selected interface client may further require uploading from a data store information relating to configuring the application based on the capabilities of the selected interface client.

Figure 3:
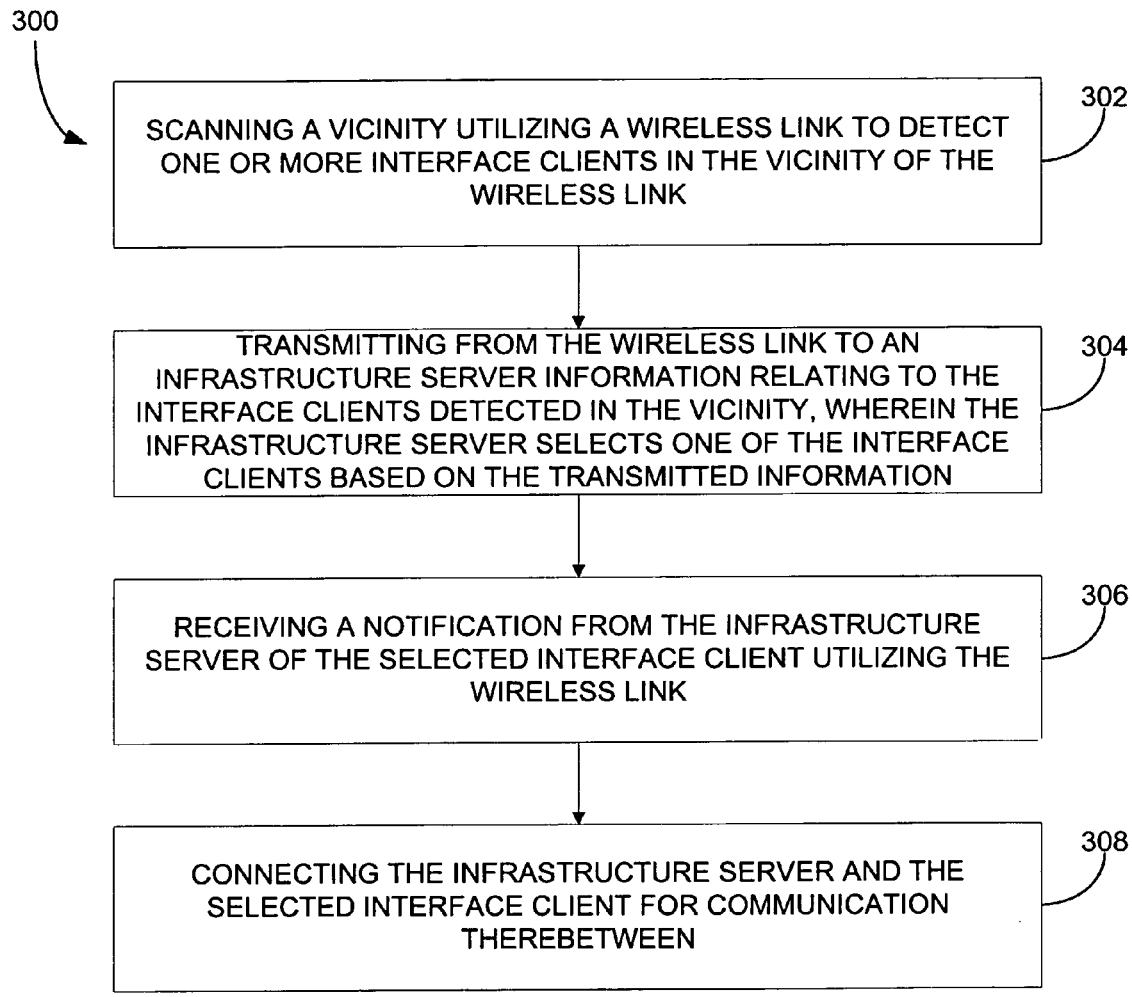
FIG. 3 is a flowchart of a process for utilizing a wireless link in an interface roaming network in accordance with an embodiment of the present invention.

FIG. 3 is a flowchart of a process 300 for utilizing a wireless link in an interface roaming network in accordance with an embodiment of the present invention. A wireless link is utilized in operation 302 to scan a vicinity of the wireless link to detect one or more interface clients in the vicinity. In operation 304, the wireless link then transmits to an infrastructure server information relating to the interface clients detected in the vicinity. Based on the transmitted information, the infrastructure server then selects one of the interface clients. Subsequently, the wireless link receives a notification from the infrastructure server of the selected interface client in operation 306 and, in operation 308, a connection between the infrastructure server and the selected interface client is initiated for communication therebetween.

In an embodiment of the present invention, the wireless link may, upon activation, transmit an activation notification to the infrastructure server prior to scanning the vicinity for interface clients to indicate to the infrastructure server that the wireless link is activated. In another embodiment of the present invention, the wireless link may periodically scan the vicinity utilizing the wireless link to detect additional interface clients, and, if an additional interface client is detected in the vicinity of the wireless link, notify the infrastructure server of the detection of the additional interface client(s). Subsequently, the wireless link may receive a query from the infrastructure server as to whether the user of the wireless link wants to connect to the additional interface client. The wireless link may include a display for displaying the query to the user and an input device for permitting the user to input an answer to the query for subsequent transmission from the wireless link to the infrastructure server.

In an aspect of the present invention, the infrastructure server and the selected interface client are connected for communication via the wireless link. In an additional aspect of the present invention, the scanning of the vicinity to detect one or more interface clients may include receiving a signal from each interface client in the vicinity of the wireless link. In another embodiment of such an aspect, the wireless link may first transmit an initial signal in the vicinity for receipt by interface clients in the vicinity whereby the signals received by the wireless link from the interface clients in the vicinity of the wireless link are transmitted by the interface clients in response to the initial signal from the wireless link.

In a further aspect of the present invention, the signal information relating to the interface clients detected in the vicinity may include information relating the capabilities of the detected interface clients. The signal information may also include information relating to the location of the detected information. In one embodiment, the signal information provided to the wireless link by the interface clients may be transmitted to the infrastructure server from the wireless links. In yet another embodiment of the present invention, formatting information may be received by the wireless link from the infrastructure server. The wireless link may then subsequently receive content from the infrastructure server. The wireless link may format the content based on the received formatting information and then transmit the formatted information to the interface client so that the formation information may be displayed by the interface client. As an option, the formatted content may be encrypted by the wireless link prior to transmission to the interface client so that only the interface client can access the formatted content.

Figure 4:
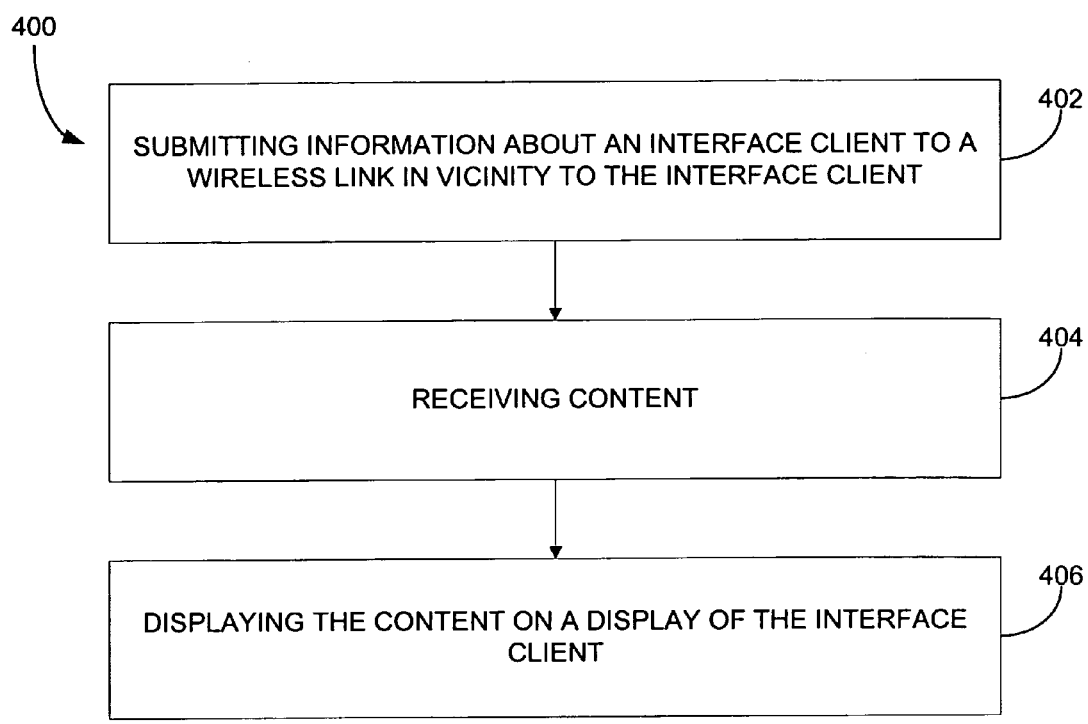
FIG. 4 is a flowchart for a process for utilizing an interface client in an interface roaming network in accordance with an embodiment of the present invention.

FIG. 4 is a flowchart for a process 400 for utilizing an interface client in an interface roaming network in accordance with an embodiment of the present invention. In general, an interface client in the interface roaming network submits information about the interface client to a wireless link in vicinity to the interface client in operation 402. The interface client may then subsequently receive content in operation 404 and display the content on a display in operation 406.

In an embodiment of the present invention, an interface client may receive a signal from the wireless link when the wireless link is in the vicinity of the interface client prior to submitting the information about the interface client to the wireless link. In one such embodiment, the signal from the wireless link may be transmitted from the wireless link in response to a prior signal transmitted from the interface client. Also, the signal from the wireless link may include information identifying a user of the wireless link.

In an aspect of the present invention, the information about the interface client may include: information about the capabilities of the interface client, information about display capabilities of the interface client, information about an input device of the interface client, and/or information about the location of the interface client. In another embodiment of the present invention, the content may be received from an infrastructure server. In one such embodiment, the content may be received from the infrastructure server via the wireless link. In another such embodiment the interface client may be connected to the infrastructure server via its own connection and not through the wireless link. In another aspect of the present invention, the content may be formatted based on the submitted information about the interface client.

Connection Via A User's Wireless Link

As mentioned above, a personal device 102 may be carried by a user to perform a link between the interface client close to the user and the infrastructure. By separating the display and input interface from this device (possibly leaving a small simple display on the device), it will enable a desired small form-factor of the user's device. One may think of this as an extended cell phone, but it may likely be more like a gateway or router that communicates with the wireless infrastructure that also includes a cell phone functionality. The cell phone operation may just be one of many functions that the device serve, and the actual cell phone functionality may be implemented as a wireless head set communicating with the communications device. In the following portion of the specification, the wireless link device 102 may be denoted as a "LitePoint" or simply as a "wireless link".

A functionality of this device is be its ability to roam with different interface clients that it connects to using a short-range wireless connection. This functionality may be implemented with hardware creating the wireless link (the wireless link) and by a protocol that can service roaming and can manage a multiple of interface clients.

When a wireless link 102 is activated, it will connect to the infrastructure server 104 to inform of its activation and also scan for usable interface clients in its proximity. As mentioned earlier, the wireless link may include a rudimentary interface. This interface may only offer minimum functionality and may be similar to a graphic enabled display of a cell phone. In use, a wireless link periodically searches to find available interface clients in its vicinity. It then generate a list of the possible interface clients and reports this list to the infrastructure server 104. This list may include various information about the interface client, its display capabilities, its input devices, and the device's geographical location. The infrastructure server then recommends/selects one of the interface clients, and the wireless link contacts the interface client and initiates a connection. From this point on, the user of the wireless link device is able to interact with the interface client. Since the infrastructure server knows the capabilities of the interface client, the infrastructure server can format the user experience to make best use of the interface client's capabilities.

In one embodiment, the infrastructure server may run the application including the display and only transmit the data to the interface client. In another embodiment, the infrastructure server may upload a small program (script, client, etc.) either to the wireless link or to the actual interface client. The infrastructure server then communicates with this program using a low bandwidth protocol, and the program (e.g., interface driver program) formats the infrastructure server generated contents for the interface client.

It is likely that the user experience may change significantly as the interface changes. For example, if one is composing an email on a full screen graphical environment like a normal computer, the user interface is expected to be similar to the well-known computer user interface. If a smaller screen is used and no keyboard is available, it may change to a pen input based interface (the pen input portion may even reside on the wireless link), and if the device is the minimal interface of the wireless link, the user interface may change to become voice operated. Since the interface client reports to the infrastructure server its capabilities, the infrastructure server can upload different interface driver programs to the device to adapt to the user interface if needed. As an option, the most used interface driver programs may reside in the wireless link 102 or an interface client. Since the infrastructure server has access to the wireless link and the interface client, it has the ability to update the interface driver program if needed.

In a preferred embodiment, the applications are running on the infrastructure server, and the wireless link operates more like a thin client device, that still has the ability to execute programs and store data on its own. The wireless link may communicate with the infrastructure server using any high-speed wireless connection, but a protocol for this communication may be designed to enable the described operation, and at the same time geared towards low bandwidth and acceptable latency performance. Similarly, the connection between the wireless link and the external interface client can be any wireless protocol that can provide the sufficient throughput and latency requirement. A standard like Bluetooth or a derivative of this may suffice for the communication between the wireless link and the interface client.

An important aspect of the system may be its ability to roam between interface clients, and maintain the exact point the session was terminated. For example, the user may be receiving stock marked news via voice (i.e., text2voice on the infrastructure server) using the build-in user interface on the wireless link. When a better external interface client is in reach, the infrastructure server may ask the user if he/she wants to switch to the other interface client. As this interface client may allow the user to select specific news-stories using a graphical interface, it is likely that the user may want to switch. The switch may be initiated such that the user may be viewing the story that was presented by the text-voice on the infrastructure server.

The cursor may even be exactly where the reading was terminated at the time of the switch. To make this possible the wireless link may need maintain some information about the application presented to the interface client. If there are no significant changes in the interface client, the system may automatically be able to continue, but if a major change in the interface client's capability is encountered, the wireless link may need to send its information back to the infrastructure server, and the infrastructure server may then convert the stored scenario to fit the new interface client. This assumes that the wireless link serves the interface client (executes the interface driver program). In the case that the interface client executes the interface driver program, the wireless link must inform the infrastructure server that a new interface client is being connected.

The following portion of the specification discusses four possible modes of operation: (1) a normal first mode, (2) a second mode where there is no external interface client, (3) a third mode where there is no infrastructure connection but there is access to a local or proximal interface client, and (4) a fourth mode where there is no connection to infrastructure and no external interface client access.

FIG. 5 is a schematic diagram illustrating a normal mode 500 of operation in accordance with an embodiment of the present invention. In this first mode, the wireless link device 102 is connected to both the infrastructure server 104 through the wireless infrastructure 108 and to an external interface client 110 via a transceiver 116. Examples of locations where such a mode may exist include be a hotel room, in a train, in a car (with display) or at the airport. The applications are controlled by the infrastructure server 104, and the wireless link 102 is similar to a smart thin client.

FIG. 6 is a schematic diagram illustrating a second mode 600 of operation where no external interface client is available in accordance with an embodiment of the present invention. This is very similar to the first mode in that the wireless link device is in communication with the infrastructure server 104 via the wireless network 108 except that the wireless link device 102 utilizes its own built-in interface. Examples of scenarios where this mode may exist include use of the wireless link walking on the street, sitting in a fishing boat, or driving in a car. The operation is similar to the operation in the normal mode with the application being run by the infrastructure server and the wireless link acting as a thin client.

FIG. 7 is a schematic diagram illustrating a third mode 700 of operation where there is no infrastructure connection from the wireless link to the infrastructure server but where there is access to an interface client proximal to the wireless link in accordance with an embodiment of the present invention. In this third mode, the wireless link 102 is not able to connect to the infrastructure but has access to an external interface client 110 via the transceiver 116.

Examples of this could be in an airplane, in a car outside the wireless coverage area. In this scenario, the functionality of the wireless link 102 may be limited to built-in applications and applications downloaded from the infrastructure server 104 when the wireless link was last connected to the server. Some user data may be available and can be synchronized with the main data residing at the infrastructure server upon reconnection. Some illustrative built-in applications may include scheduler/calendar and address book as well as entertainment applications like games and music recording and/or playing capabilities. The external interface client 110 can be used to improve the user experience by providing a more capable visual display for viewing the application (such as, for example, when playing a game on an airplane or when examining the user's schedule). This may not result in the absolute optimal user experience since the wireless link is controlling the interface client and may have limited memory, processing capabilities, and power supply (i.e., being battery powered).

FIG. 8 is a schematic diagram of a fourth mode 800 of operation wherein there is no connection to infrastructure from the wireless link and no external interface client access in accordance with an embodiment of the present invention. In this scenario the wireless link 102 may act like a standard personal digital assistant (PDA) where the vital applications such as a scheduler/calendar application and an address book application as well as other entertainment applications may be available and can be accessed using the built-in interface of the wireless link 102. This mode may be utilized in areas with no wireless coverage and no access to an external interface client.

It is important to understand that the system is controlled from the infrastructure server 104 and that all primary data resides on the infrastructure server (or accessible from the data store. Because of this, the data may always be up to date when the user accesses it, and it may also be possible to update data and applications automatically. It may also enable cooperation to have secure links to inside a firewall using technology like virtual private networks (VPN). This way the company solves the problem of the user having stored sensitive data on a laptop or a home computer. It also ensures that the available data and applications are always fully up to date.

One could also envision a scenario where the interface client contacts the infrastructure server using a user's wireless link. This could be to send a picture back to the infrastructure server, to report malfunctions, or to inform the infrastructure server that a certain interface capability is available, and the infrastructure server can the initiate contact to the user through this device.

The wireless link can be seen as a communication engine that enables the link between the interface client and the infrastructure server whenever it is available. The communication in setting up a connection could be implemented ad follows: Establishing a connection between the infrastructure server and the wireless link may happen by the existing system protocols used in the particular wireless infrastructure. The requirement is to be able to provide a connection like TCP/IP or similar connection between the infrastructure server and the wireless link. A higher-level protocol is defined allowing the infrastructure server control the wireless link device and other interface clients connected to the wireless link using relative low bandwidth. The communication between the wireless link and an interface client is also important. Again, a standard communication protocol can be used such as Bluetooth. Bluetooth is capable of supporting the scanning for other devices, so it may be able to detect other interface client while communicating with the selected interface client.

First, the device must detect the different interface clients in its vicinity. This can be initiated either by the wireless link or by the interface client. Having the wireless link initiate the communication may drain more power from the battery powered wireless link, but having the interface clients initiate the communication is likely to result in increased interference when multiple devices are trying to contact a wireless link device. If the wireless link is the device initiating the connection, it may send out a beacon, and await the interface clients reporting their presence.

On the other hand, if the interface clients are the one initiating the connection, they may send out a beacon, and the wireless link may listen for such beacons. When a beacon is received, the wireless link may acknowledge its presence, and the two devices may start to interchange relevant information. Among other information, the interface client may reports its capabilities. This can be in the form of an ID-type or directly its capabilities like display resolution, sound capability, input devices etc. It may also include information not directly related to the technical information of the interface client lie its location etc. This information is reported back to the infrastructure server, or adopted by the wireless link. From this point on the infrastructure server has identified the user, the presence and capabilities of the interface client. The infrastructure server formats the interface client to fit the user's preferences using the best-suited user interface. This can be done by having the infrastructure server transfer an interface driver program to the wireless link (if it is not already there) or use an interface driver program that could be executed directly by the interface client if needed. (Initially it is expected that the wireless link may execute the interface driver program, but as the system gets acceptance, the code may move to ran on the interface client). A protocol with reduced bandwidth requirements can be used to control the interface client. The infrastructure server or the wireless link may know where the user ended the last session, and can continue from there. Thus, interface roaming is achieved.

The infrastructure server can also target the user's preferences based on past user behavior (patterns) and predefined user preferences. This may enable the user interface to appear smart, and this may enable smart applications. Since the terminal is likely to be in a fixed location, the infrastructure server may be informed about the interface client's location, and this can be included in the user interface setup as well. For example, the interface client can make suggestions to the user about sales, good restaurants etc. This may be an option that the user has the power to enable or disable.

Similar, as part of scanning for new devices, the system can also register the user in the surrounding infrastructure, and this may enable personalized greetings, dedicated services, and automatic-registration actions for example.

Display Roaming When an Interface Client is Already Connected to the Infrastructure Server As previously mentioned, embodiments of the present invention may enable display roaming when an interface client already has a way to contact the infrastructure server without using (i.e., going through) the user's wireless link. In such an embodiment, the user may logon to the interface client to identify the user. Many different authentication schemes may be possible—one example could be a universal ID-card like a SIM card, and fingerprints identification (or identification by biometrics), or a User ID/password system. The wireless link may be used to perform the user identification or may include a SIM card therein for enabling the identification. However, in this embodiment, the wireless link does not have to serve as the communication link between the interface client and the infrastructure server. If the interface client does not offer a convenient input interface, the wireless link could also be used as the input device.

Figure 9:
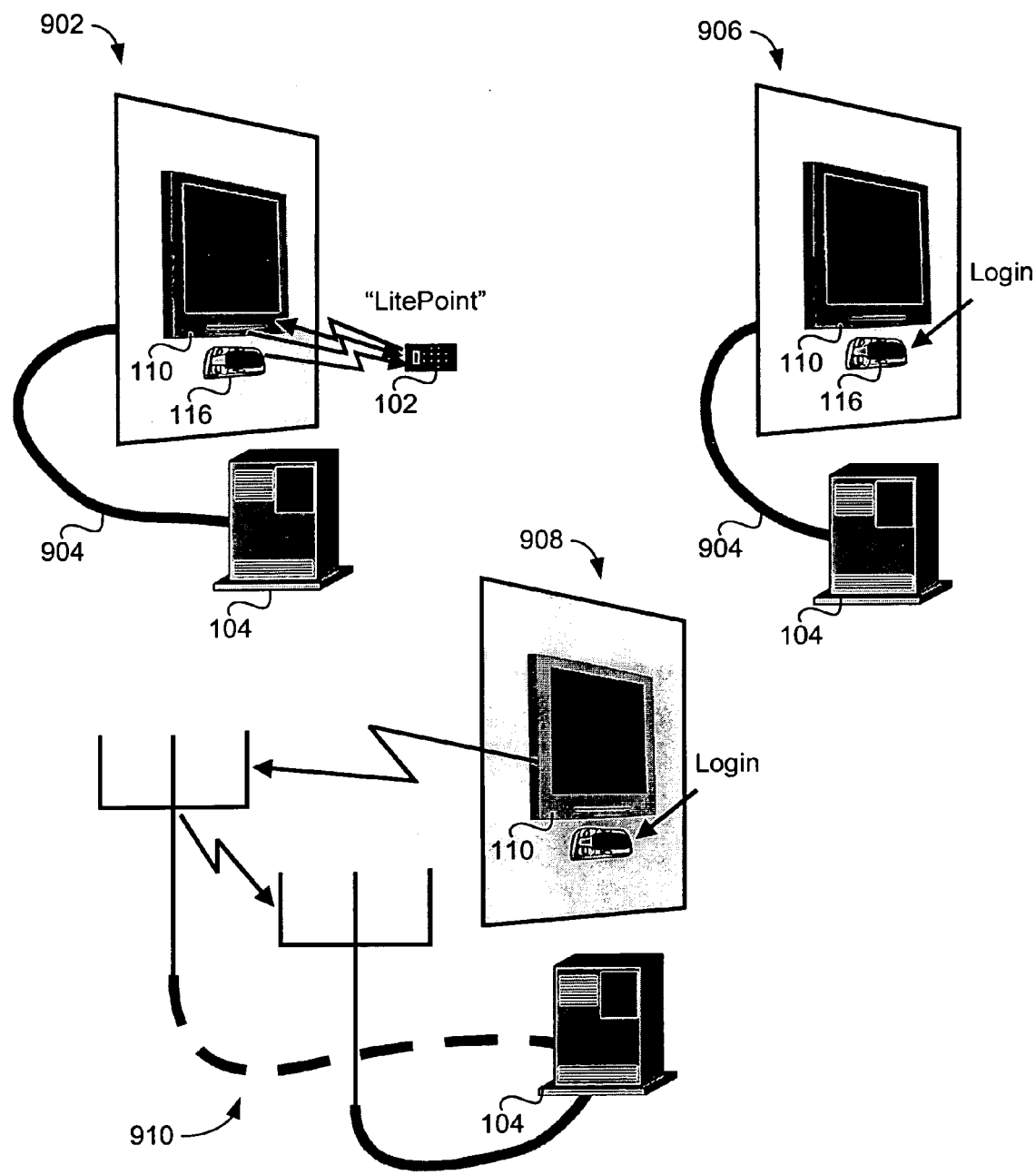
FIG. 9 is a schematic diagram of some possible exemplary modes for interface roaming when the interface client has its own connection to the server in accordance with an embodiment of the present invention.

FIG. 9 is a schematic diagram of some possible exemplary modes for interface roaming when the interface client 110 has its own connection to the server 104 separate from a connection provided through the wireless link 102 in accordance with an embodiment of the present invention. The illustrative modes illustrated in FIG. 9 include a mode 902 where the connection between the interface client 110 and the server is a wired connection 904 where identification of the user is provided via the wireless link 102, a mode 906 where the connection between the interface client 110 and the server is a wired connection 904 and where identification of the user is not provided via the wireless link, and a mode 908 where the connection between the interface client 110 and the server is a direct wireless connection 910 to the infrastructure or a connection though a scatter net.

As discussed above, logon to an interface client can be performed in many ways. However, there are two distinct options. Either the user physically performs a logon procedure (initiated by the user), or the interface client detects the user e.g. by contacting the wireless link, and the user's ID back. While a central user database may exist, it may be more advantageous that the some kind of electronic identification (wireless link, Electronic ID-card etc.) be used since it can identify the user and the user's infrastructure server.

After the user login (verified by the infrastructure server)—the infrastructure server should already know the interface client's capabilities, so the infrastructure server can tell the interface client to generate the interface the user had when last connected. The infrastructure server may reformat the user experiences to the capabilities of the new interface client.

An issue in this embodiment is the ability to end a session. Since the user is not part of the link between the infrastructure server and the interface client, the connection can exist even after a user has left the interface client. Therefore, the system must include a way to identify if the user is still using the interface client. A logoff button may be provided exist as part of the interface. An embodiment may rely on the electronic identification of the user and where the system may automatically logoff if the electronic identification is no longer presented to the interface (e.g., if the wireless link is no longer in range, or the electronic ID-card is removed, the session may automatically terminate).

Hardware Implementation

Figure 10:
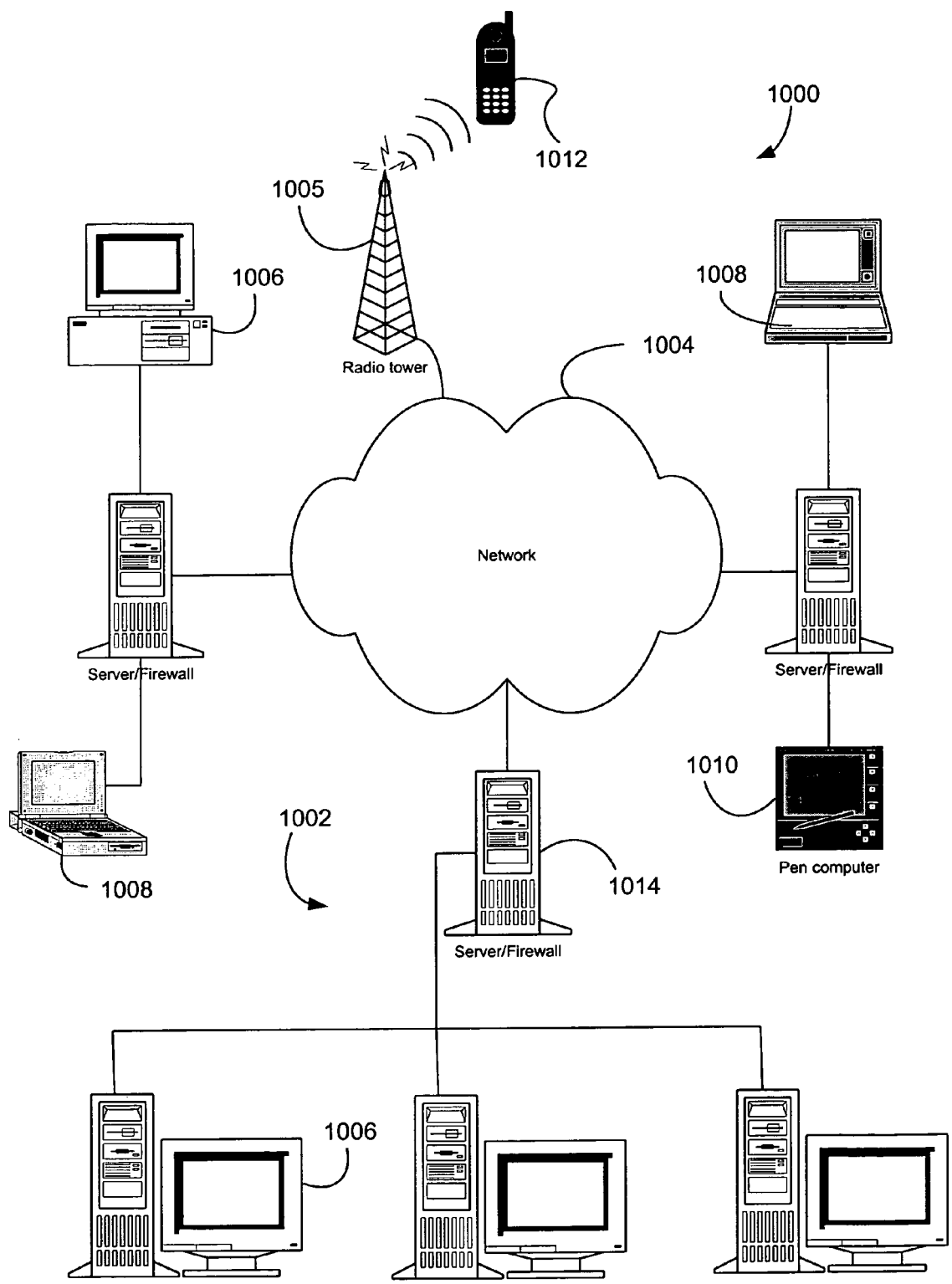
FIG. 10 is a schematic diagram of an illustrative system with a plurality of components in accordance with an embodiment of the present invention.

FIG. 10 illustrates an exemplary system 1000 with a plurality of components 1002 in accordance with one embodiment of the present invention. As shown, such components include a network 1004 which take any form including, but not limited to a local area network, a wide area network such as the Internet, and a wireless network 1005. Coupled to the network 1004 is a plurality of computers which may take the form of desktop computers 1006, lap-top computers 1008, hand-held computers 1010 (including wireless devices 1012 such as wireless PDA's or mobile phones), or any other type of computing hardware/software. As an option, the various computers may be connected to the network 1004 by way of a server 1014 which may be equipped with a firewall for security purposes. It should be noted that any other type of hardware or software may be included in the system and be considered a component thereof.

Figure 11:
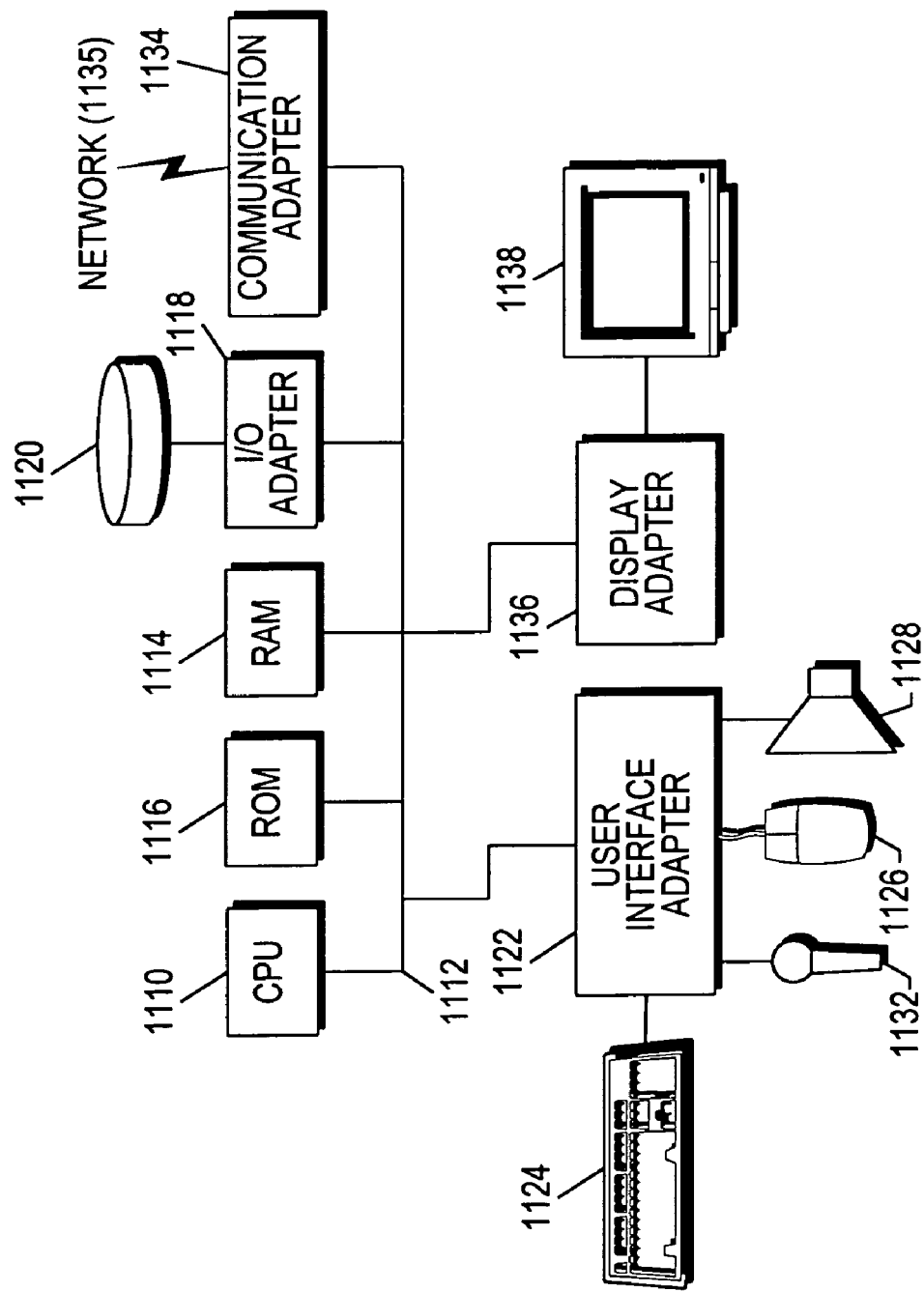
FIG. 11 is a schematic diagram of a representative hardware environment in accordance with an embodiment of the present invention.

A representative hardware environment associated with the various components of FIG. 10 is depicted in FIG. 11. In the present description, the various sub-components of each of the components may also be considered components of the system. For example, particular software modules executed on any component of the system may also be considered components of the system. FIG. 11 illustrates a typical hardware configuration of a workstation in accordance with one embodiment having a central processing unit 1110, such as a microprocessor, and a number of other units interconnected via a system bus 1112.

The workstation shown in FIG. 11 includes a Random Access Memory (RAM) 1114, Read Only Memory (ROM) 1116, an I/O adapter 1118 for connecting peripheral devices such as disk storage units 1120 to the bus 1112, a user interface adapter 1122 for connecting a keyboard 1124, a mouse 1126, a speaker 1128, a microphone 1132, and/or other user interface devices such as a touch screen (not shown) to the bus 1112, communication adapter 1134 for connecting the workstation to a communication network 1135 (e.g., a data processing network) and a display adapter 1136 for connecting the bus 1112 to a display device 1138.

An embodiment of the present invention may be written using JAVA, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters. OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystems's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom U1 components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite." Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII.). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for facilitating user interface roaming, comprising:
   receiving by an infrastructure server from a wireless device a list of usable interface clients in proximity to the wireless device, wherein each usable interface client has capabilities associated therewith;
   selecting by the infrastructure server one of the interface clients from the list;
   notifying by the infrastructure server the wireless device of the selected interface client;
   initiating by one of the infrastructure server and the wireless device a connection with the selected interface client;
   executing by one of the infrastructure server and the wireless device an application based on the capabilities of the selected interface client, wherein execution of the application generates content; and
   transmitting the generated content to the interface client.

2. The method of claim 1, further comprising receiving a notification from the wireless device that the wireless device has been activated, wherein the wireless device determines usable interface clients in proximity thereto upon activation thereof.

3. The method of claim 1, wherein the connection with the selected interface client is initiated via the wireless device.

4. The method of claim 1, wherein the generated content is transmitted to the interface client via the wireless device.

5. The method of claim 1, wherein each interface client includes a display.

6. The method of claim 1, further comprising receiving information from a user based on the generated content, generating subsequent content based on the received information, and transmitting the subsequently generated content to the interface client.

7. The method of claim 1, further comprising receiving a notification that another interface client is proximate to the wireless device, querying a user whither the user would like to switch to the other interface client, and transmitting generated content to the other interface client upon receipt of a response from the user indicating that the user wants to switch to the other interface client.

8. The method of claim 1, wherein the wireless device receives the content if the list of usable interface clients includes zero usable interface clients in proximity to the wireless device.

9. The method of claim 1, further comprising receiving information from the wireless device input by a user.

10. The method of claim 1, wherein the wireless device and the interface client are capable of communicating utilizing TCP/IP or IPX protocols.

11. The method of claim 1, wherein the wireless device has telephony capabilities.

12. The method of claim 1, wherein executing an application based on capabilities of the selected interface client further comprises uploading from a data store information relating to configuring the application based on the capabilities of the selected interface client.

13. A computer program product facilitating user interface roaming, comprising:
   at least one computer useable medium including computer readable program code such that when executed by one or more processors, the computer readable program code causes the one or more processors to:
   receive via an infrastructure server from a wireless device a list of usable interface clients in proximity to the wireless device, wherein each usable interface client has capabilities associated therewith;
   select via the infrastructure server one of the interface clients from the list;
   notify via the infrastructure server the wireless device of the selected interface client;
   initiate via one of the infrastructure server and the wireless device a connection with the selected interface client;
   execute via one of the infrastructure server and the wireless device an application based on the capabilities of the selected interface client, wherein execution of the application generates content; and
   transmit the generated content to the interface client for display.

14. The computer program product of claim 13, wherein the computer readable program code, when executed by the one or more processors, further causes the one or more processors to receive a notification from the wireless device that the wireless device has been activated, wherein the wireless device determines usable interface clients in proximity thereto upon activation thereof.

15. The computer program product of claim 13, wherein the connection with the detected interface client is initiated via the wireless device.

16. The computer program product of claim 13, wherein the generated content is transmitted to the interface client via the wireless device.

17. The computer program product of claim 13, wherein each interface client includes a display.

18. The computer program product of claim 13, wherein the computer readable program code, when executed by the one or more processors, further causes the one or more processors to receive information from a user based on the generated content, computer readable program code for generating subsequent content based on the received information, and computer readable program code for transmitting the subsequently generated content to the interface client.

19. The computer program product of claim 13, wherein the computer readable program code, when executed by the one or more processors, further causes the one or more processors to receive a notification that another interface client is proximate to the wireless device, computer readable program code for querying a user whether the user would like to switch to the other interface client, and computer readable program code for transmitting generated content to the other interface client upon receipt of the response from the user indicating that the user wants to switch to the other interface client.

20. The computer program product of claim 13, wherein the computer readable program code, when executed by the one or more processors, further causes the one or more processors to transmit the generated content to the wireless device if the list of usable interface clients includes zero usable interface clients in proximity to the wireless device.

21. The computer program product of claim 13, wherein the computer readable program code, when executed by the one or more processors, further causes the one or more processors to receive information from the wireless device input by a user.

22. The computer program product of claim 13, wherein the wireless device and the interface client are capable of communicating utilizing TCP/IP or IPX protocols.

23. The computer program product of claim 13, wherein the wireless device has telephony capabilities.

24. The computer program product of claim 13, wherein the computer readable program code such that when executed by one or more processors causes the one or more processors to execute an application based on capabilities of the selected interface client further causes the one or more processors to upload from a data store information relating to configuring the application based on the capabilities of the selected interface client.

25. A system for facilitating user interface roaming, comprising:

logic for receiving by an infrastructure server from a wireless device a list of usable interface clients in proximity to the wireless device, wherein each usable interface client has capabilities associated therewith;

logic for selecting by the infrastructure server one of the interface clients from the list;

logic for notifying by the infrastructure server the wireless device of the selected interface client;

logic for initiating by one of the infrastructure server and the wireless device a connection with the selected interface client;

logic for executing by one of the infrastructure server and the wireless device an application based on the capabilities of the selected interface client, wherein execution of the application generates content; and logic for transmitting the generated content to the interface client.

26. The system of claim 25, further comprising logic for receiving a notification from the wireless device that the wireless devices has been activated, wherein the wireless device determines usable interface clients in proximity thereto upon activation thereof.

27. The system of claim 25, wherein the connection with the selected interface clients is initiated via the wireless device.

28. The system of claim 25, wherein the generated content is transmitted to the interface client via the wireless device.

29. The system of claim 25, wherein each interface client includes a display.

30. The system of claim 25, further comprising logic for receiving information from a user based on the generated content, logic for generating subsequent content based on the received information and logic for transmitting the subsequently generated content in the interface client.

31. The system of claim 25, further comprising logic for receiving a notification that another interface client is proximate to the wireless device, logic for querying a user whether the user would like to switch to the other interface clients, and logic for transmitting generated content to the other interface client upon receipt of a response from the user indicating that the user wants to switch to the other interface client.

32. The system of claim 25, wherein the wireless device receives the content if the list of usable interface clients includes zero usable interface clients on proximity in the wireless device.

33. The system of claim 25, further comprising logic for receiving information from the wireless device input by a user.

34. The system of claim 25, wherein the wireless device and the interface client are capable of communicating utilizing TCP/IP or IPX protocols.

35. The system of claim 25, wherein the wireless device has telephony capabilities.

36. The system of claim 25, wherein the logic for executing an application based on capabilities of the selected interface client further comprises logic for uploading from a data store information relating to configuring the application based on the capabilities of the selected interface client.

\* \* \* \* \*

UNITED STATES PATENT AND TRADEMARK OFFICE
CERTIFICATE OF CORRECTION

| | |
|---|---|
| PATENT NO. | : 7,093,017 B1 |
| APPLICATION NO. | : 09/695493 |
| DATED | : August 15, 2006 |
| INVENTOR(S) | : Christian Volf Olgaard et al. |

It is certified that error appears in the above-identified patent and that said Letters Patent is hereby corrected as shown below:

Column 10, line 62, delete "lie" and insert --like--.

Column 18, line 12, delete "U1" and insert --UI--.

Column 22, line 66, delete "detected" and insert --selected--.

Column 24:
Lines 28 and 39, delete "in" and insert --to--.

Signed and Sealed this

Twenty-eighth Day of November, 2006

JON W. DUDAS
*Director of the United States Patent and Trademark Office*